United States Patent [19]
Sander et al.

[11] 4,092,685
[45] May 30, 1978

[54] CASSETTE CHANGER APPARATUS HAVING PRIORITY EJECT

[75] Inventors: Willy M. Sander, Stamford; Andre T. Debaudringhien, Bridgeport, both of Conn.

[73] Assignee: Dictaphone Corporation, Rye, N.Y.

[21] Appl. No.: 722,143

[22] Filed: Sep. 10, 1976

[51] Int. Cl.$^2$ ........................ G11B 23/04; G11B 15/68
[52] U.S. Cl. .......................................... 360/92; 360/71
[58] Field of Search ..................... 360/92, 96, 91, 132, 360/134, 69, 71–74, 105–106; 242/197–200, 180–181; 352/6–8; 214/16.4

[56] References Cited

U.S. PATENT DOCUMENTS

| | | | |
|---|---|---|---|
| 3,431,367 | 3/1969 | Nickl | 360/92 |
| 3,658,193 | 4/1972 | Gross | 360/96 |
| 3,671,682 | 6/1972 | Suzuki | 360/92 |
| 3,825,949 | 7/1974 | Pyles | 360/92 |
| 3,848,264 | 11/1974 | Wilson | 360/92 |
| 3,886,591 | 5/1975 | Bettini | 360/92 |
| 3,996,616 | 12/1976 | Sturrock et al. | 360/71 |
| 3,996,617 | 12/1976 | Cousino | 360/92 |
| 4,021,855 | 5/1977 | Czonka et al. | 360/69 |
| 4,024,354 | 5/1977 | Bolick, Jr. | 360/69 |

FOREIGN PATENT DOCUMENTS

| | | | |
|---|---|---|---|
| 949,193 | 6/1974 | Canada | 360/92 |

*Primary Examiner*—Alfred H. Eddleman
*Attorney, Agent, or Firm*—Arthur V. Smith

[57] ABSTRACT

A cassette changer apparatus for use in a multiple cassette record and/or playback system. An input supply of magnetic tape cassettes is spaced from an output store, with a record/playback station disposed intermediate the input supply and output store. A fresh cassette is conveyed from the input supply to the record/playback station, and thence to the output store whereat an elevator normally loads the cassette into the output store. A cassette eject mechanism comprised of a discharge chute is positioned beneath the elevator. The chute is adapted to receive a conveyed cassette but the elevator is normally conditioned to intercept such a cassette and prevent it from reaching the chute. Priority control circuitry selectively displaces the elevator before a conveyed cassette is intercepted thereby, whereby the cassette is received by the chute, slides therealong and is ejected.

6 Claims, 5 Drawing Figures

4,092,685

CASSETTE CHANGER APPARATUS HAVING PRIORITY EJECT

BACKGROUND OF THE INVENTION

This invention relates to a multiple cassette record and/or playback apparatus and, more particularly, to an automatic cassette eject mechanism to be used with such apparatus, whereby a selected cassette can be removed from the apparatus almost immediately after processing.

Magnetic tape cassettes wherein a magnetic tape is stored in a self-contained cartridge are widely used in various record and/or playback devices, such as in home entertainment systems, data logging systems, dictation systems and the like. Such tape cassettes offer the advantages of greatly simplifying the loading and unloading of tape by an operator, of protecting the tape during recording and playback operations and during handling of the tape, and of minimizing the bulk of the recording and playback devices used therewith. However, since the amount of tape that can be stored easily in a typical cartridge is rather constrained, there are finite limits on the amount of information that can be recorded thereon. In an attempt to increase such limitations of recorded information, some cassette manufacturers have attempted to increase the length of tape stored in a cassette. Nevertheless, in many applications, it is desirable to record and/or play back information substantially continuously for a length of time that exceeds even the capacity of these cassettes.

Accordingly, there have been proposals for automatic cassette-changing devices whereby a multiple of tape cassettes can be automatically loaded individually and successively onto a record/playback deck to permit an operator to record or reproduce substantial lengths of information. In one proposed automatic cassette changing device, described in U.S. Pat. No. 3,821,806, a plurality of cassettes is stored in drum-like configuration and retrieved individually to be loaded onto a record/playback deck and then returned to the storage drum. This proposed device requires a relatively complex mechanical structure for the retrieval, loading, unloading and return of cassettes.

In another proposed automatic cassette changer, such as described in U.S. Pat. No. 3,752,485, plural cassettes are stored in a magazine of a type that is commonly found in photographic slide projector apparatus. As the magazine is indexed, individual cassettes are sequentially "pushed" from their storage compartments by a pushing arm and loaded onto a record/playback deck. After information is recorded on or reproduced from the loaded cassette, it is returned to its storage compartment in the magazine by the pushing arm and the magazine then is indexed to enable the next cassette to be retrieved.

A similar magazine-type cassette-changer is described in U.S. Pat. No. 3,860,964. These type of cassette-changing devices require a relatively complex mechanical construction and, moreover, are subject to various malfunctions, such as cassette jams, during loading and unloading operations. Moreover, if used to record information thereon, it may be difficult to withdraw recorded cassettes from the magazine until the full complement of cassettes has been used.

In a further proposed automatic cassette-changer, such as described in U.S. Pat. No. 3,756,608, plural cassettes are stored in a magazine in stacked configuration, and individual cassettes are loaded onto a record/playback deck and thence into an output magazine, also in stacked configuration. As described in this patent, the record/playback deck is disposed beneath the input stack and a movable platform lowers a cassette from the input stack onto the deck. After a recording or playback operation, the platform is raised and a "pusher" pushes the cassette from the platform into the output magazine. The use of mechanical "pushers" is undesirable because of a susceptibility to jam the cassettes during a loading and/or unloading operation. Furthermore, since the next succeeding cassette cannot be loaded onto the deck until the immediately preceding cassette is fully unloaded by the mechanical "pusher", this automatic cassette-changer is relatively inefficient. That is, since this changer is not capable of loading a cassette simultaneously with unloading a cassette, a significant amount of time is required for a complete unloading/loading cycle.

In one contemplated use of an automatic cassette changer, such as in a central dictation system, many operators located at respective remote dictate stations will communicate selectively and individually with a central recorder with which the cassette changer is used. As messages are dictated and cassettes are used, or filled with dictation, the used cassettes are stored in, for example, an output magazine of the type described in aforementioned U. S. Pat. 3,756,608. In some operations, the information recorded on a particular cassette may be designated as "priority" information that should be transcribed or listened to as soon as possible. However, if this priority cassette is loaded into the output magazine in the usual manner, rapid recall of the recorded information is delayed. One proposed solution to this problem, as described in U. S. Pat. No. 3,756,608, is to move the priority cassette into position to be loaded into the output magazine, but the final "load" step is not performed. Thus, after the next cassette is used, this next cassette will be moved toward the position occupied by the priority cassette and will "push" the priority cassette into, for example, an output hopper. Hence, the priority cassette can be withdrawn from the apparatus sooner than if it had been loaded in the output magazine.

Unfortunately, with the mechanism of the type described in U.S. Pat. No. 3,756,608, the priority cassette cannot be removed, or ejected, from the apparatus until the next succeeding cassette is used. The delay in sufficiently using the next cassette can be many hours, or even days, depending upon the overall usage of the apparatus. Thus, the priority information cannot be retrieved promptly. On the other hand, if the cassette next succeeding the priority cassette is not used to record information, but merely is "pushed" through the apparatus, the waste of a cassette merely for the purpose of ejecting a priority cassette is inefficient and not satisfactory.

OBJECTS OF THE INVENTION

Therefore, it is an object of the present invention to provide improved cassette changing apparatus wherein the problems encountered by prior art devices are avoided.

It is another object of this invention to provide cassette changing apparatus having an improved priority cassette eject feature.

A further object of this invention is to provide an improved eject mechanism for use in a multiple cassette record and/or playback system wherein a designated priority cassette can be ejected from the system substantially immediately after processing.

An additional object of this invention is to provide a priority cassette eject mechanism for use in a multiple cassette record and/or playback system which does not require a second, following cassette to eject the priority cassette from the system.

Various other objects, advantages and features of the present invention will become readily apparent from the ensuing detailed description, and the novel features will be particularly pointed out in the appended claims.

SUMMARY OF THE INVENTION

In accordance with the present invention, a multiple cassette record and/or playback system includes an input supply of magnetic tape cassettes, each cassette housing magnetic tape therein; an output store spaced from the input supply for storing cassettes; a record/playback station intermediate the input supply and output store; a conveyor for conveying a cassette from the input supply to the record/playback station, and thence to the output store; an elevator at the output store for receiving a conveyed cassette and for loading same into the output store; and a cassette eject mechanism comprised of a discharge chute positioned beneath the elevator for receiving a selected cassette conveyed from the record/playback station to the output store, the elevator normally being conditioned to intercept the conveyed cassette and to prevent it from being received by the discharge chute and being selectively displaced before the conveyed cassette is intercepted thereby, whereby the cassette slides along the discharge chute to be ejected.

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

The automatic cassette changer apparatus described below can be used in, for example, a central dictation system using magnetic tape cassettes as the recording medium, a home entertainment system wherein pre-recorded magnetic tape cassettes are played back in sequence, a data logging system wherein data is recorded on individual magnetic tape cassettes, and the like. For the purpose of explaining the present invention, it will be assumed that the automatic cassette changer is used in the environment of a central dictation system. However, it should be clearly understood that this environment merely is illustrative and is not intended to limit the scope or use of the present invention.

Figure 1:
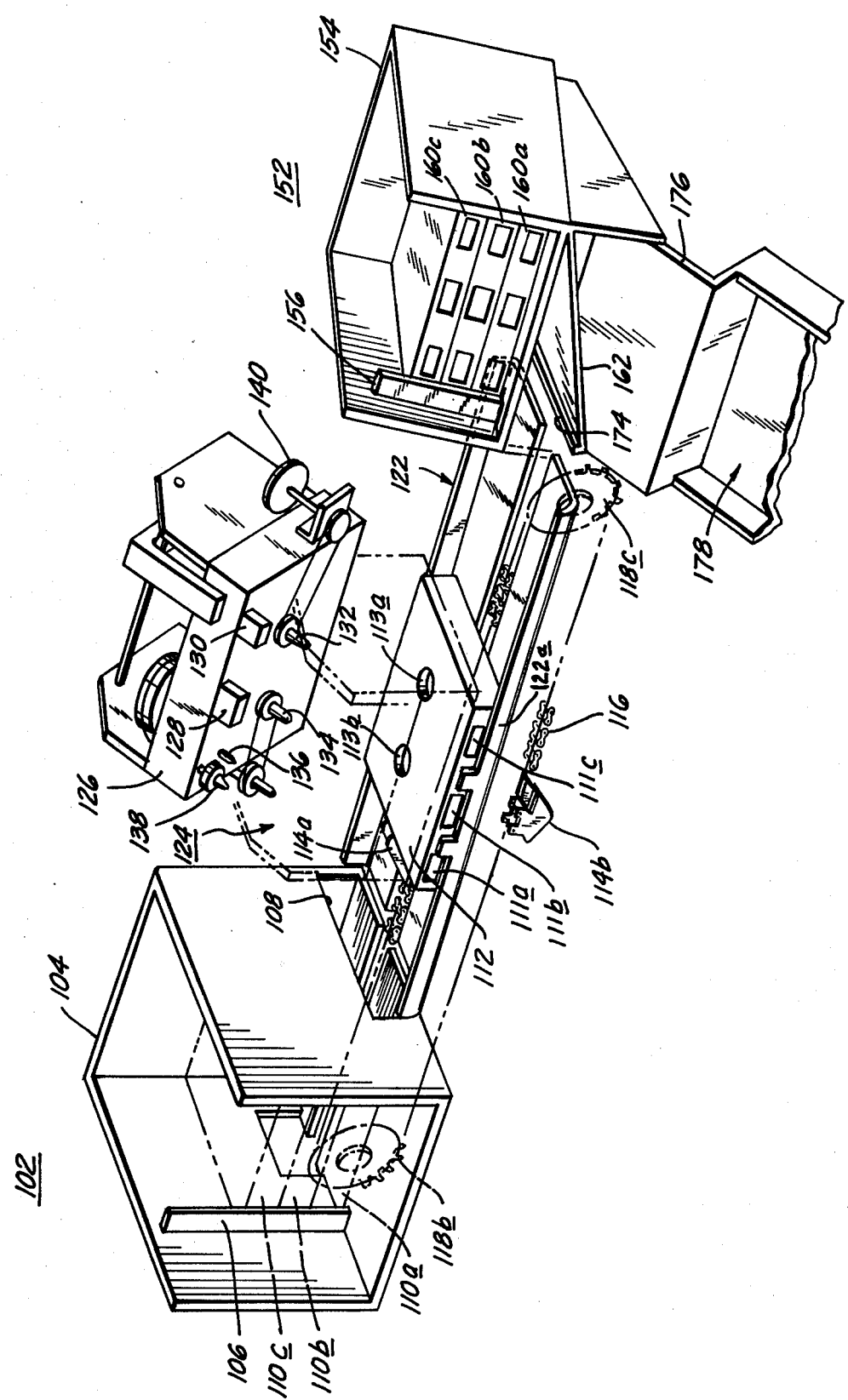
FIG. 1 is a perspective view of a preferred embodiment of a cassette changer that can be used with multiple cassette record and/or playback apparatus.
Figure 2:
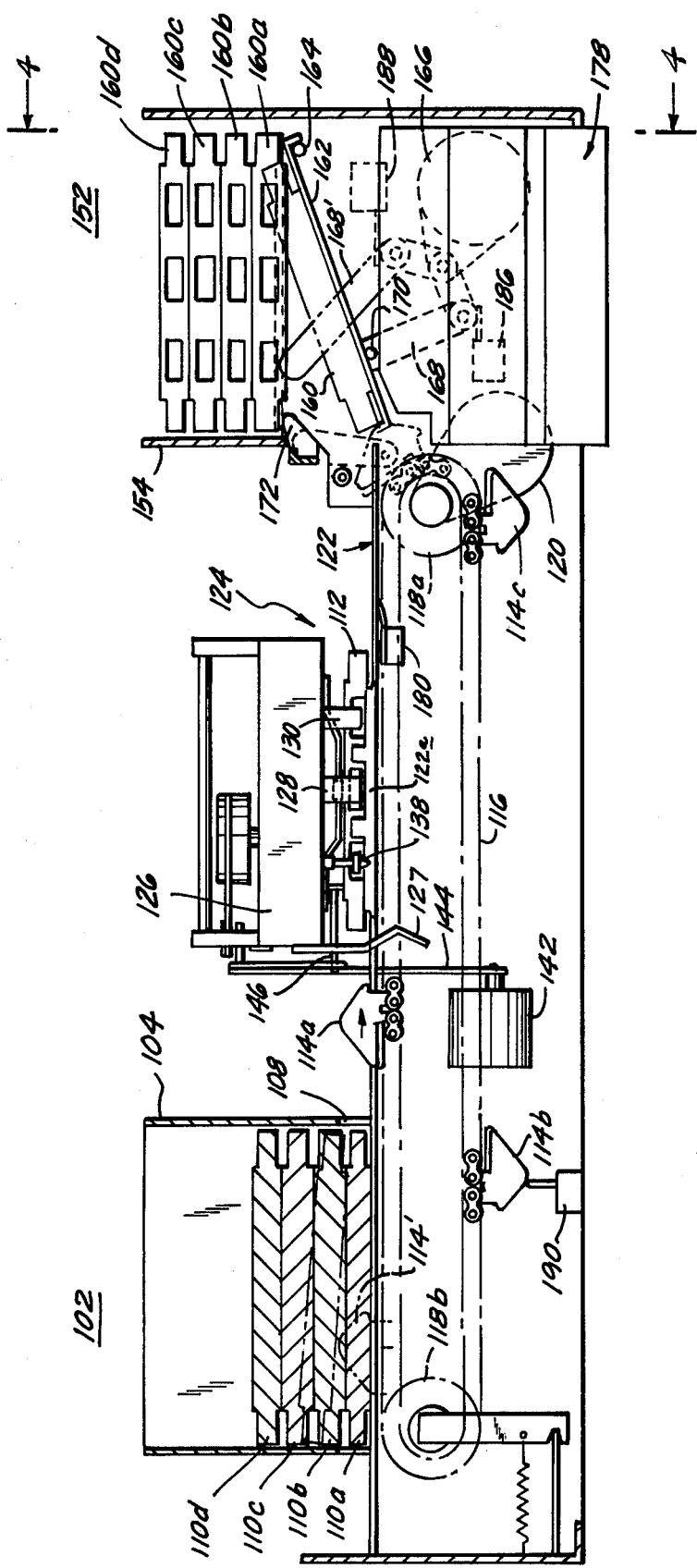
FIG. 2 is a front plan view of the apparatus shown in FIG. 1.
Figure 3:
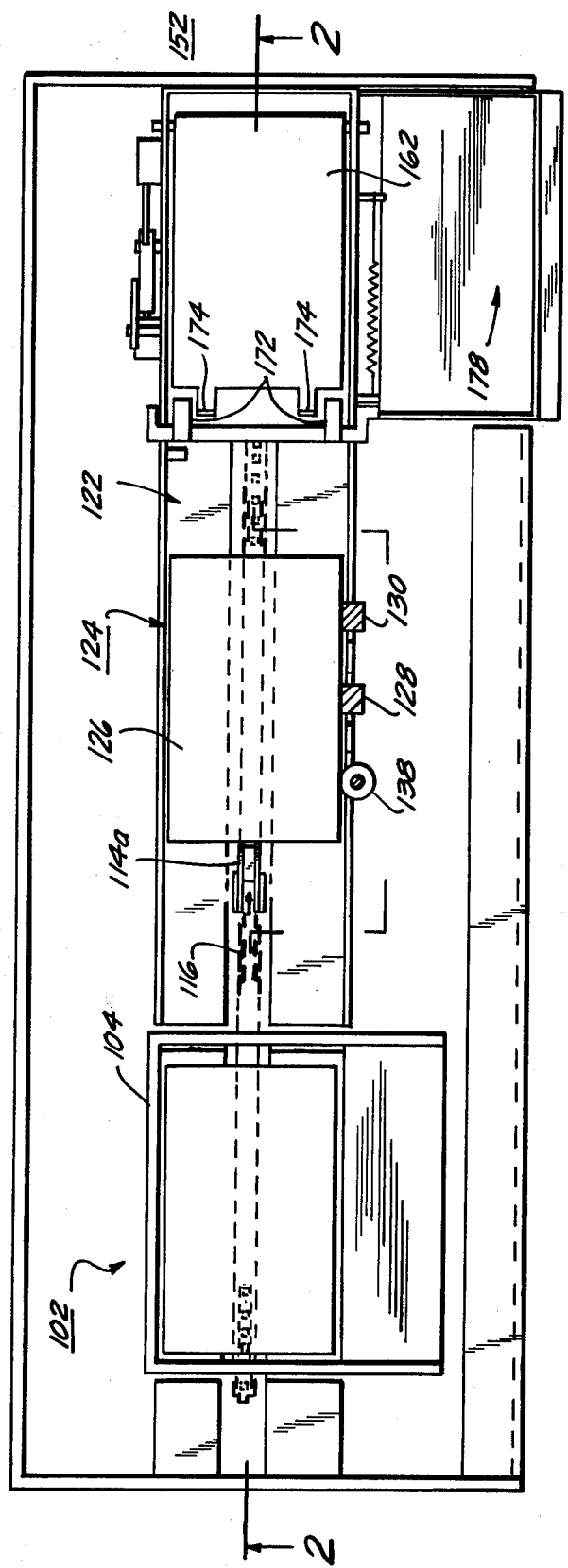
FIG. 3 is a top plan view of the apparatus shown in FIG. 1.

A preferred embodiment of the automatic cassette changer is shown in FIGS. 1–3. The central dictation system with which the cassette changer can be used may be of the type having electrical connections (not shown) to individual ones of a multiple of remote dictate stations, each such remote station having suitable controls to enable an operator to initiate a dictate operation and to review his previously dictated information, or messages. The cassette changer apparatus preferably is comprised of an input supply 102 adapted to store a multiple of magnetic tape cassettes, such as cassettes 110a, 110b, . . ., a record/playback station 124 having a record/playback deck 126 adapted to record information on and play back information from a magnetic tape cassette, and an output store 152 to which processed cassettes, i.e., cassettes which have had information recorded on or pre-recorded information played back from the tape stored therein, are conveyed.

Input supply 102 comprises a magazine 104 formed of a plurality of walls, for example, three walls to support the cassettes 110a, 110b, . . . therein. Magazine 104 also may be provided with one or more guide rails 106 for the proper positioning and alignment of the stacked cassettes. An exit 108 is formed in one of the walls of magazine 104 to permit an individual cassette, such as the bottom-most cassette 110a in a stack to be conveyed out of the magazine from supply 102 toward record/playback station 124 by suitable conveying devices such as flights 114a, 114b, . . ., secured to a conveyor belt 116. To permit each flight 114a . . . to enter magazine 104 to contact the successive bottom-most cassettes, an entry aperture 105 is provided in the wall opposite that in which exit 108 is formed.

Conveyor belt 116 preferably is a chain deployed about suitable roller members, such as sprocket wheels 118a, 118b, and is driven by a belt motor 120 (FIG. 2). Sprocket wheel 118b is supported by member 119 and tension spring 119a to an end wall 103a of the apparatus. Flights 114a, 114b, . . ., are seen to be wedge-shaped, or triangular, and are mechanically secured to and spaced along the length of belt 116. Each flight 114a, . . ., is adapted to contact a bottom-most cassette 110a in input stack 102, to remove that cassette from the stack (as shown in FIG. 2) and to push that cassette to record/playback station 124. The wedge-shape of the flights, formed of leading and trailing sloping portions, is preferred so that when the leading sloping portion of a flight, such as flight 114' shown in broken lines in FIG. 2, pushes the bottom-most cassette 110a through exit 108, the remaining cassettes 110b, 110c, . . . in input supply 102 are raised gently and gradually over the leading portion without impeding the removal of cassette 110a and, furthermore, without jostling the remaining cassettes. The trailing portion of the flight gradually lowers the remaining cassettes 110b, 110c, . . ., as the flight passes through exit 108 in magazine 104. Another advantage of this wedge-shaped of flights 114a, . . ., is that it minimizes the likelihood of ensnaring, or catching, the front or nose of the flight in a cassette drive-spindle aperture which would deleteriously affect the smooth conveyance of the cassette.

A guide platform 122 extends substantially between input supply 102 and output store 152 for the purpose of suitably supporting and guiding a cassette, such as cassette 112, that is conveyed from input supply 102 to record/playback station 124 and then to output store 152. As shown in FIGS. 1 and 2, bottommost cassette 110a in magazine 104 rests upon a support that is coplanar with the surface of guide platform 122. If desired, platform 122 may extend within magazine 104 and form the floor for supply 102.

Record/playback deck 126 is provided at station 124 intermediate input supply 102 and output store 152, as shown. The deck includes a suitable chassis upon which are mounted a record/playback head 128 and an erase head 130 which are conventional in record/playback apparatus and which are adapted to be inserted through appropriate apertures 111b and 111c in the side wall of cassette 112 so as to engage the tape therein when the cassette has been conveyed to station 124. Deck 126 also includes a supply reel drive spindle 132, a take-up reel drive spindle 134, a capstan 136 and a pinch roller 133, as is conventional. Preferably, deck 126 is of the type whose construction is disclosed in greater detail in copending Applications Ser. Nos. 678,596 and 678,704, both filed Apr. 20, 1976 and both assigned to the assignee of the present invention.

In the illustrated embodiment, deck 126 is coupled to a deck drive motor 142 by linkage 144, motor 142 being a unidirectional motor adapted to pivot the deck about a suitable pivot axis 146 that is substantially parallel to the side wall of cassette 112 that is provided with apertures 111a, 111b and 111c, the pivot axis being secured to suitable supports (not shown). Thus, when motor 142 is energized to produce a reciprocating effect, deck 126 is adapted to pivot between its first (up), or cassette unload position shown in solid lines in FIG. 1, and its second (down), or operative position shown in broken lines in FIG. 1 and shown more clearly in FIG. 2. As is appreciated, when deck 126 is driven towards its down position, drive-spindles 132 and 134 are inserted into corresponding drive-spindle apertures 113a and 113b in the top wall of cassette 112. Also, capstan 136 is inserted into a corresponding capstan-receiving aperture (not shown) so as to cooperate with pinch roller 138 when the latter enters apertures 111a in the side wall of cassette 112 to drive the tape housed within the cassette.

During normal operation, cassette 112 is conveyed by flight 114a to record/playback station 124. In order to provide a fine alignment of cassette 112 with the drive spindles, capstan, pinch roller and heads of deck 126, the deck is provided with a positioning member 125 depending from the deck chassis and having an elbow 125a, as illustrated in FIG. 2, to shift cassette 112 slightly to the right when the deck pivots downward so that the respective apertures in the cassette are in final alignment with the aforementioned elements of deck 126. Also, as shown in FIG. 2, a guide member 129 is suspended from deck 126. An elbow provided on the free end of member 129 contacts cassette 112 when deck 126 is pivoted downward and is adapted to "push" the cassette forwardly into final alignment of the cassette with respect to the tape processing elements of the deck, as described in copending application 722,144.

Deck 126 also is provided with a chopper wheel 140 that is suitably coupled to supply reel drive spindle 132 so as to rotate when the supply reel drive spindle is driven. This chopper wheel is described in greater detail in the aforementioned copending applications and cooperates with suitable photosensing devices to derive sensor pulses indicative of the movement of tape either in a record or in a playback mode. These sensor pulses may be used in the manner described in copending applications Ser. Nos. 722,141 and 722,162.

Output store 152 is adapted to store processed cassettes 160, 160a, 160b, . . . in the so-called first-in, first-out configuration. That is, the cassette that had been used first appears on the top of output store 152, for example, cassette 160d (FIG. 2), and the cassette that had been used last appears on the bottom of this stack, such as cassette 160a. The output store comprises a magazine 154 formed of a plurality of walls, for example, three walls, to support the stack of cassettes 160a, 160b, . . ., therein. As will be described below, this stack is supported above the plane of support platform 122 and, accordingly, an elevator assembly is provided to receive a processed cassette, such as cassette 160, conveyed from record/playback station 124 by, for example, flight 114a and to add this cassette into the stack in magazine 154. In the illustrated embodiment, the elevator assembly comprises an elevator platform 162 pivotally coupled at 164 to a suitable support or frame of the apparatus. An elevator motor 166, preferably a unidirectional motor, is mechanically linked through linkage 168 and pin 170 to elevator platform 162, and is adapted to produce a reciprocating effect to raise and lower the elevator platform so as to correspondingly add a processed cassette, such as cassette 160, to the bottom of the stack in magazine 154. Pivot connection 164 is disposed in a plane above the plane of guide platform 122 so that, in its cassette-receiving position, shown in FIG. 1 and in solid lines in FIG. 2, elevator platform 162 is inclined downwardly to receive cassette 160 driven onto its cassette-receiving portion by the flight as illustrated. Lip members 174 are provided on the cassette-receiving portion of platform 162 and are disposed below the plane of guide platform 122 when the elevator platform is in its illustrated inclined position. These lip member prevent cassette 160 from sliding off elevator platform 162. After cassette 160 is loaded onto platform 162, elevator motor 166 is operated to pivot the elevator platform upwardly and thus add cassette 160 as the bottom-most cassette in magazine 154.

As best seen in FIGS. 2 and 3, a spring-biased bracket member is pivotally coupled to the chassis of the apparatus (not shown) and has projections 172 that extend into magazine 154 so as to support the stack of cassettes 160a, 160b, . . ., in output store 152. As shown, projections 172 have cammed bottom surfaces so as to permit the bracket to pivot away from its normal support position and out of interference with cassette 160 that is raised by elevator platform 162. Once cassette 160 clears the projections, the spring biasing returns the bracket to its normal support position.

Figure 4:
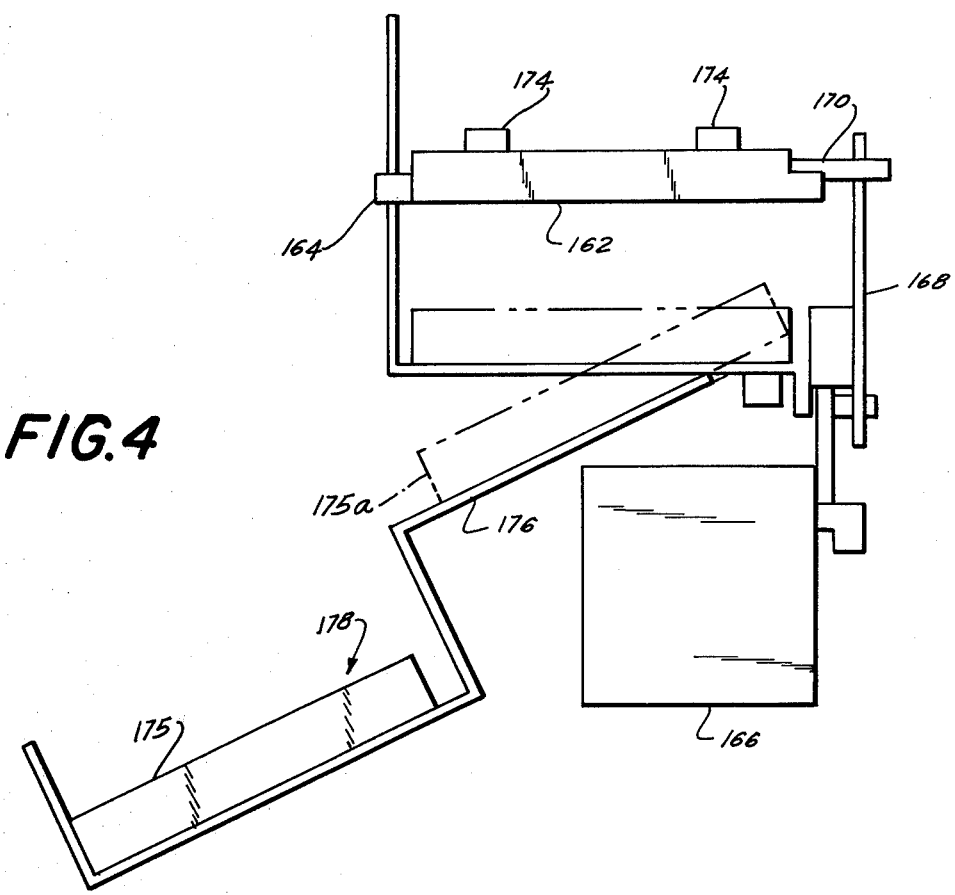
FIG. 4 is a view taken along lines 4—4 in FIG. 2.

When the illustrated apparatus is used in the environment of a central dictation system, an operator, such as a dictator at a remote dictate station or a supervisor at the site of the apparatus (or at a console), may designate the cassette upon which information is recorded as a special or "priority" cassette. Output store 152 thus is provided with a priority cassette eject feature whereby the priority cassette is discharged immediately rather than being placed as the bottom-most cassette in the stack of magazine 154. Since elevator platform 162 is pivoted at 164 in a plane above the plane of guide platform 122, it is appreciated that if the elevator platform is raised, a conveyed cassette merely will pass beneath it; whereas, if platform 162 remains in its normal, inclined position, it is conditioned to intercept the cassette. Accordingly, the "priority" cassette eject feature includes a discharge chute or ramp 176 (FIGS. 1 and 4) disposed beneath elevator platform 162 and angled downwardly to enable a priority-ejected cassette to be received by the chute and slide therealong into a storage bin 178 adjacent the chute. To this effect, when a cassette is designated as a priority cassette, elevator platform 162 is driven by elevator motor 166 to its raised position out of intercepting relation with respect to the path of conveyance of a cassette, and then, subsequently, the priority cassette is conveyed by belt 116 from record/playback station 124 towards output store 152. Since elevator platform 162 is not in its normal cassette-receiving position, the priority cassette, such as cassette 175a in FIG. 4, passes beneath the raised elevator platform and slides down ramp 176 into storage bin 178, shown as cassette 175. Elevator platform 162 than may return to its normal inclined cassette-receiving position for normal operation, as will be described.

In order to monitor the progress of a change operation, and to determine when various interdependent functions should be performed in that operation, suitable limit switches are provided to sense the condition of deck 126, the condition of elevator platform 162, and the position of, for example, conveyed cassette 112 and flight 114b. More particularly, a limit switch 180 is disposed at record/playback station 124 and is adapted to be closed so as to produce a cassette-in-position signal when cassette 112 is conveyed by belt 116 into general alignment with deck 126 at the record/playback station. A pair of limit switches (not shown) are disposed at record/playback station 124 and cooperate with an actuator secured to deck 126. When deck 126 is pivoted to its down, or operative, position, the actuator closes one limit switch in this pair to produce a deck-down signal. Similarly, the other limit switch is closed by the actuator to produce a deck-up signal.

Limit switches 186 and 188, shown in FIG. 2, are analogous to the aforementioned pair of limit switches and are adapted to be closed selectively by linkage 168 depending upon the position of elevator platform 162. More particularly, when elevator platform 162 is in its down, or cassette-receiving, position, linkage 168 closes limit switch 186 to produce an elevator-down signal. Conversely, when elevator 162 is raised, such as when the linkage is in the position shown at 168', limit switch 188 is closed to produce an elevator-up signal.

Yet another limit switch 190 is provided and is adapted to be closed by a flight, such as flight 114b, that has been driven to a predetermined position with respect to magazine 104. The closing of limit switch 190 produces a belt-in-position signal.

Figure 5:
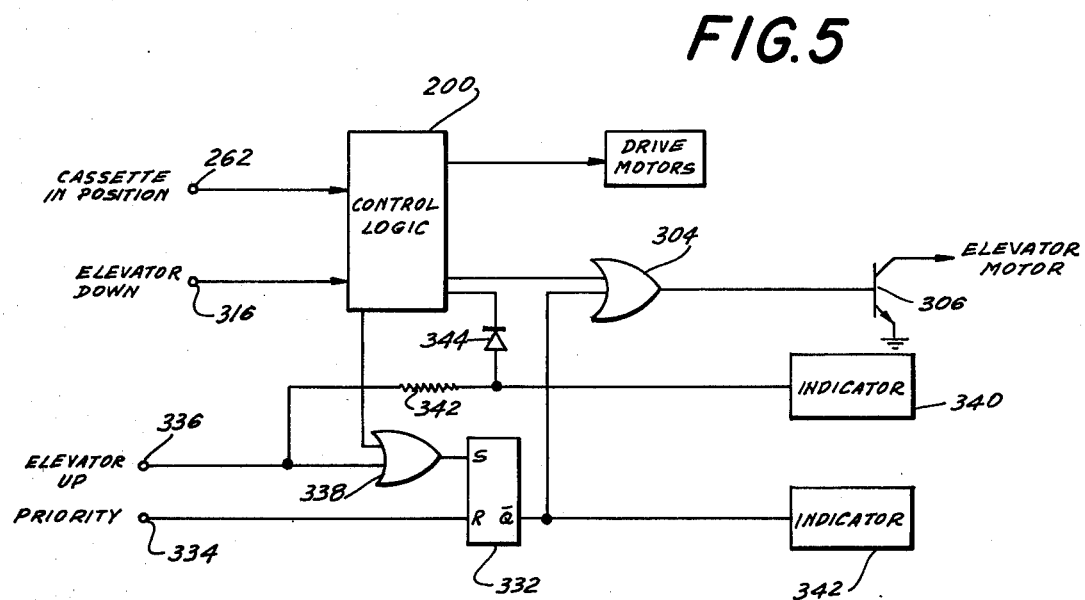
FIG. 5 is a logic diagram of cassette eject control circuitry that selectively controls an eject operation.

The signals produced by the aforedescribed limit switches are supplied to control logic 200, shown figuratively in FIG. 5, whereat the signals are used to selectively control the operation of motors 120, 142 and 166 to perform a cassette changing operation. This control logic is disclosed in detail in copending application 722,162.

In its general operation, let it be assumed that the initial position of belt 116 is as illustrated by the solid lines of flights 114a, 114b, . . . in FIG. 2, and let it be further assumed that deck 126 is processing a cassette 112, and elevator platform 162 is in its normal inclined cassette-receiving position for receiving cassette 112 after this cassette has been processed. As mentioned above, for the purpose of this description, the expression "processing a cassette" means recording information on a cassette, as in a central dictation system, or reproducing information from a cassette, as in a dictation system, a transcribing system or a home entertainment system. After cassette 112 has been processed, the control logic described in application 722,162 energizes deck drive motor 142 to pivot deck 126 from its down position (FIG. 2) to its up position (FIG. 1) so that cassette 112 can be conveyed to output magazine 154. Once deck 126 reaches its up position, the control logic energizes belt motor 120 so that flight 114a conveys cassette 112 onto elevator platform 162 and effectively wedges it between the platform and bottom-most cassette 160a in the output magazine. As mentioned previously, lip members 174 on elevator platform 162 prevent the received cassette, such as cassette 160, from sliding off the platform. Concurrently with this conveying operation, flight 114b passes through aperture 105 in magazine 104 to contact the bottom-most cassette 110a in the magazine and to convey this cassette through exit 108 and along guide platform 122 toward record/playback station 124. When this fresh cassette is positioned properly at record/playback station 124, the control logic de-energizes belt motor 120, energizes deck motor to pivot deck 126 downwardly into operative relation with the cassette and, concurrently, energizes elevator motor 166 to pivot elevator platform 162 upwardly to add the last-processed cassette, such as the cassette shown at 160 in FIG. 2, into magazine 154 as the bottom-most cassette.

When elevator platform 162 is pivoted upwardly, cassette 160 acts as a lever to urge the stack of cassettes 160a, 160b, . . ., upward. This raises the stack above projections 172 and permits them (and the bracket) to pivot out of interference when contacted by cassette 160. Cassette 160 thus is added as the bottom-most cassette in this stack. After cassette 160 clears the projections, the bracket returns to its illustrated support position for the stack. Elevator platform 162 then is driven by motor 166 to its inclined cassette-receiving position.

Deck 126 then may be controlled to record information on the magnetic tape housed within the cassette loaded thereon, such as the cassette designated 112, or may perform a playback operation to reproduce information that had been recorded on tape. After the record or playback operation is completed, a cassette changing cycle is initiated by the control logic, whereby the deck motor pivots deck 126 to its up position, belt motor 120 drives belt 116 to convey the processed cassette onto elevator platform 162 and to convey a fresh cassette from input supply 102 to record/playback station 124, and then elevator motor 166 pivots elevator platform 162 to its up position while the deck motor now drives deck 126 to its down position, as just described. Once elevator motor 166 returns elevator 162 to its down position, the illustrated apparatus is prepared for reuse and for a subsequent cassette changing cycle. In the event that input magazine ultimately is depleted of cassettes, the apparatus automatically assumes a stand-by state awaiting further operation once the supply of cassettes is replenished, as described in copending application 722,162.

Before proceeding with the description of a priority cassette eject operation, reference is made to FIG. 5 which schematically illustrates the priority control circuitry. As mentioned above, when elevator platform 162 is pivoted to be displaced from its normal cassette receiving inclined position, a conveyed cassette essentially falls onto ramp 176 to be ejected into bin 178. The priority control circuitry is adapted to energize elevator drive motor 166 to pivot platform 162 prior to the initiation of a change operation (i.e., before cassette 112 is conveyed from record/playback station 124) such that cassette 112 may be conveyed to and ejected by ramp 176 during the next change operation.

The priority control circuit includes a flip-flop circuit 332 having, for example, its set input coupled through an OR circuit 338 to an input terminal 336 to receive an elevator-up signal, such as may be produced when limit switch 188 (FIG. 2) is closed. As is known, a logical OR circuit is adapted to produce a binary "1" when a binary "1" is supplied to any one or more of its inputs. For the purpose of the present discussion, a relatively higher voltage level is representative of a binary "1" and a relatively lower voltage level, such as ground, is representative of a binary "0".

The reset input of flip-flop circuit 332 is connected to an input terminal 334 and is adapted to receive a priority signal produced in response to the selection of a priority mode of operation (as by an operator at a remote dictate station or by a supervisor). The Q output of flip-flop circuit 332 is coupled through an OR circuit 304 to be supplied as a drive signal capable of turning ON elevator drive transistor 306. This transistor may be coupled to a motor drive circuit, such as a relay, triac, or the like, for energizing elevator motor 166. Additionally, the Q output of flip-flop circuit 332 also is supplied to a suitable indicator 242 to apprise an operator that the priority mode has been selected and that elevator platform 162 is being pivoted out of intercepting position with respect to an incoming cassette conveyed from record/playback station 124.

The elevator-up signal applied to input terminal 336 also is supplied through a resistor 342 to an indicator 340 to provide an additional indication of the position of elevator 162. In one embodiment of the record and/or playback apparatus with which the priority cassette eject feature is used, it is preferred not to indicate that the elevator is in its up, or output store load position, during a normal change operation. Hence, during such an operation, when the elevator is driven upward, a binary "0" is produced by system control logic 200 to forward bias a diode 344 and thus shunt the elevator-up signal that would have been applied to indicator 340. But when a priority eject operation is selected, control logic 200 reverse biases diode 344 and indicator 340 is energized when the elevator is pivoted upward.

Control logic 200 is described in greater detail in copending application 722,162 and such description is incorporated herein by reference. Suffice it to say that the control logic controls belt drive motor 120 and the deck drive motor; and, through OR circuit 304, also controls elevator drive motor 166. As described in the copending applications, control logic 200 is responsive to a cassette-in-position signal produced by limit switch 180 (FIG. 2) and applied to input terminal 262 to turn ON transistor 306 via OR circuit 304, and also to an elevator-down signal produced by limit switch 186 (FIG. 2) and applied to input terminal 316 to turn OFF transistor 306. In addition, in the event of a detected malfunction, control logic 200 sets flip-flop circuit 332 via OR circuit 338 to insure that this flip-flop assumes its quiescent set state.

Let it be assumed that cassette 112 at record/playback station 124 is designated a "priority" cassette whereby it is to be ejected from the illustrated apparatus immediately after being processed so that the information recorded thereon can be transcribed promptly. Accordingly, at any time prior to the initiation of a change operation, the priority signal is applied to input terminal 334. This signal is effectively stored in flip-flop circuit 332 by resetting the flip-flop circuit. Consequently, a binary "1" is provided at its Q output to actuate OR circuit 304, turn ON elevator motor drive transistor 306 and energize elevator motor 166. Also, indicator 242 is energized. Hence, before the change operation is initiated, elevator plateform is pivoted away from its cassette intercept position. Once the platform reaches its up position, the elevator-up signal applied to input terminal 336 actuates OR circuit 338 to set flip-flop circuit 332 and thus clear it of the priority signal. This, of course, turns OFF transistor 306 to de-energize elevator motor 166, thus retaining elevator platform 162 at its up position.

Since a change operation has not yet been initiated, control logic 200 reverse biases diode 344 to permit the elevator-up signal to energize indicator 340. Therefore, a suitable indication of the selection of the priority mode of operation is furnished.

Now, when a change operation is initiated, control logic 200 controls belt motor 120 and the deck motor to convey the priority cassette from record/playback station 124 towards output store 152. This cassette is received by ramp 176 and slides down into storage bin 178 to be transcribed immediately. As described in copending application 722,162, the cassette change operation continues and, during this operation, limit switch 180 (FIG. 2) closes to apply the cassette-in-position signal to input terminal 262. Control logic 200 responds to this cassette-in-position signal to actuate OR circuit 304 so that transistor 306 is turned ON and elevator motor 166 is energized. Thus, elevator platform 162 is returned from its up position to its normal, inclined cassette-receiving position, and when limit switch 186 closes to apply the elevator-down signal to input terminal 316, transistor 306 is turned OFF. The illustrated apparatus then is prepared for a subsequent change operation which, if selected, may be a priority eject operation as described.

In the event of a malfunction that prevents elevator platform 162 from pivoting to its up position, flip-flop circuit 332 is not cleared by an elevator-up signal. However, this malfunction is detected by control logic 200, as described in the aforementioned application, to set, or clear, the flip-flop circuit and thus return the priority control circuit to a proper, initial state.

If desired, a suitable charging circuit may be coupled to input terminal 336 so as to add a finite delay to the elevator-up signal to avoid, for example, a possible "race" condition at diode 344 during a normal change operation. Also, elevator platform 162 may be driven in, for example, a vertical direction along suitable guide posts, or rails, rather than being pivoted. However, in such an alternative embodiment, there is a possibility that the platform would bind against such posts, thus deleteriously affecting its operation. In yet another embodiment, platform 162 acts as a deflector for conveyed cassettes such that a cassette normally is conveyed (or driven) into one storage area and, in a priority eject mode, the deflector platform guides the cassette into another priority storage area.

While the present invention has been particularly shown and described with respect to a preferred embodiment thereof, it should be readily apparent that the foregoing and various other changes and modifications in form and details may be made without departing from the spirit and scope of this invention. It is therefore intended that the appended claims be interpreted as including such changes and modifications.

What is claimed is:

1. Record and/or playback apparatus comprising an input supply of magnetic tape cassettes, an output store for said cassettes spaced from said input supply, a record/playback station intermediate said input supply and output store, conveyor means for conveying individual cassettes from said supply to said record/playback station and thence to said output store, a discharge chute for receiving a cassette conveyed from said record/playback station to said output store, an elevator disposed above said discharge chute for receiving a conveyed cassette and lifting same into said output store, said elevator normally being conditioned to intercept said conveyed cassette and prevent same from being received by said discharge chute; and means for selectively displacing said elevator before said conveyed cassette is intercepted thereby; whereby said conveyed cassette is discharged from said apparatus by said chute when said elevator is displaced.

2. The apparatus of claim 1 wherein said means for displacing said elevator comprises an elevator drive motor; motor control means for selectively energizing said drive motor; and switch means for selectively applying a control signal to said motor control means.

3. The apparatus of claim 2 wherein said switch means comprises input means for supplying a signal indicating that a cassette to be conveyed from said record/playback station is a "priority" cassette; signal storage means for storing said signal and for producing said control signal in response thereto so as to actuate said motor control means and energize said elevator drive motor; and means for clearing said signal storage means of said signal when said elevator is displaced to deactuate said motor control means and thus de-energize said motor, whereby said elevator remains displaced so that said cassette conveyed from said record/playback station is received by said discharge chute.

4. The apparatus of claim 3 further comprising system control means for controlling the conveyance of a cassette from said input supply to said record/playback station and from said record/playback station to said output store, said system control means supplying an actuating signal to said motor control means when a cassette is conveyed to said record/playback station so as to return said elevator to said normal condition to intercept a cassette subsequently conveyed from said record/playback station to said output store.

5. The apparatus of claim 1 wherein said discharge chute is an inclined ramp; and further comprising a storage bin disposed at the bottom portion of said ramp for receiving a cassette that slides down said ramp.

6. Record and/or playback apparatus having an input supply of magnetic tape cassettes upon which information is recorded and/or reproduced; an output store for said cassettes, said output store spaced from said supply; a record/playback station intermediate said input supply and output store; conveyor means for conveying individual cassettes from said input supply to said record/playback station and thence to said output store; an elevator at said output store, said elevator including a pivotable platform normally inclined to the path of conveyance of said cassettes to receive a cassette conveyed to said output store and to pivot away from said path of conveyance to load said received cassette into said output store; control means for controlling the conveyance of said cassettes and for sensing when a cassette has been conveyed to said record/playback station; a discharge chute positioned adjacent said pivotable platform of said elevator so as to receive a cassette conveyed to said output store when said platform is pivoted away from said path of conveyance, whereby said cassette slides along the length of said chute; an elevator drive motor for pivoting said platform; an elevator motor control circuit for energizing said elevator drive motor in response to an actuating signal applied thereto; input means for selectively applying an actuating signal to said elevator motor control circuit to pivot said platform away from said path of conveyance prior to the time that a cassette is conveyed from said record/playback station to said output store; and means for applying an actuating signal to said elevator control circuit from said control means when a cassette has been conveyed to said record/playback station so as to energize said elevator drive motor to return said platform to its normal inclination to said path of conveyance.

* * * * *